United States Patent [19]

Simpson

[11] 4,006,871
[45] Feb. 8, 1977

[54] AUTOMATIC PITCH AXIS CONTROL SYSTEM FOR AIRCRAFT

[75] Inventor: Robert D. Simpson, Bellevue, Wash.

[73] Assignee: The Boeing Company, Seattle, Wash.

[22] Filed: Jan. 18, 1974

[21] Appl. No.: 434,538

Related U.S. Application Data

[63] Continuation of Ser. No. 264,119, June 19, 1972, abandoned.

[52] U.S. Cl. .......................... 244/186; 235/150.22
[51] Int. Cl.² .......................................... G05D 1/12
[58] Field of Search ............. 73/178 T; 235/150.22; 244/77 A, 183, 185–187; 318/583, 584; 343/108 R

[56] References Cited
UNITED STATES PATENTS

| | | | |
|---|---|---|---|
| 3,223,362 | 12/1965 | Doniger | 244/77 A |
| 3,295,796 | 1/1967 | Gaylor | 244/77 A |
| 3,327,973 | 6/1967 | Kramer et al. | 244/77 A |
| 3,447,765 | 6/1969 | Doniger et al. | 244/77 A |
| 3,652,835 | 3/1972 | Devlin et al. | 235/150.22 |
| 3,743,221 | 7/1973 | Lykken et al. | 244/77 A |

*Primary Examiner*—Stephen G. Kunin
*Attorney, Agent, or Firm*—Conrad O. Gardner

[57] ABSTRACT

An aircraft flight control system utilizing inertial sensor input signals for providing glide slope and flare control signals in the aircraft. The autopilot approach and landing coupler system is a vertical velocity command control system utilizing signals representative of integrated vertical acceleration for providing feedback signals representative of vertical velocity and utilizing signals representative of ground velocity to provide the switchless glide slope and flare vertical velocity command signals.

10 Claims, 4 Drawing Figures

AUTOMATIC PITCH AXIS CONTROL SYSTEM FOR AIRCRAFT

This is a continuation of application Ser. No. 264,119, filed June 19, 1972, now abandoned.

This invention relates to signal processing means for providing automatic approach and landing control signals and more particularly relates to an improved system for automatically controlling the pitch axis of an aircraft during an approach and landing sequence.

Prior art systems which fly an aircraft close to the landing runway and thereafter approach that runway and flare out for touchdown utilize either or both signal sources representative of pitch attitude and barometric referenced altitude rate. The utilization of these several signal sources can result in a less reliable system and may introduce undesired performance characteristics in response to environmental disturbances of the aircraft during an approach and landing.

It is accordingly an object of this invention to provide means in a pitch axis control system for providing fine accuracy and increased reliability glide slope and flareout control signals thereby preventing errors of increased magnitude in the aircraft flight path at extremely low altitudes.

It is a further object of this invention to provide means in a pitch axis control system for updating the glide slope and flareout control parameters by utilization of signals representative of aircraft ground velocity.

It is yet another object of this invention to provide means in a pitch axis control system for utilizing signals representative of vertical velocity which are independent of barometric vertical velocity signal generating sources.

It is still a further object of this invention to provide means in a pitch axis control system for providing glide slope control signals and flare-out control signals without requiring utilization of switching devices for operating the system in the flare-out maneuver mode.

The above and further objects are achieved in accordance with a preferred embodiment of the invention by utilization in a pitch axis control system of signal processing means defined by expressions implementing one set of control laws for developing glide slope control signals and flare-out control signals.

Other objects, features, and advantages of the present invention will become apparent from the following description in conjunction with the accompanying drawings in which:

FIG. 4 is a graph illustrative of signals representative of flight path angle limiter output as a function of altitude above terrain.

Figure 1:
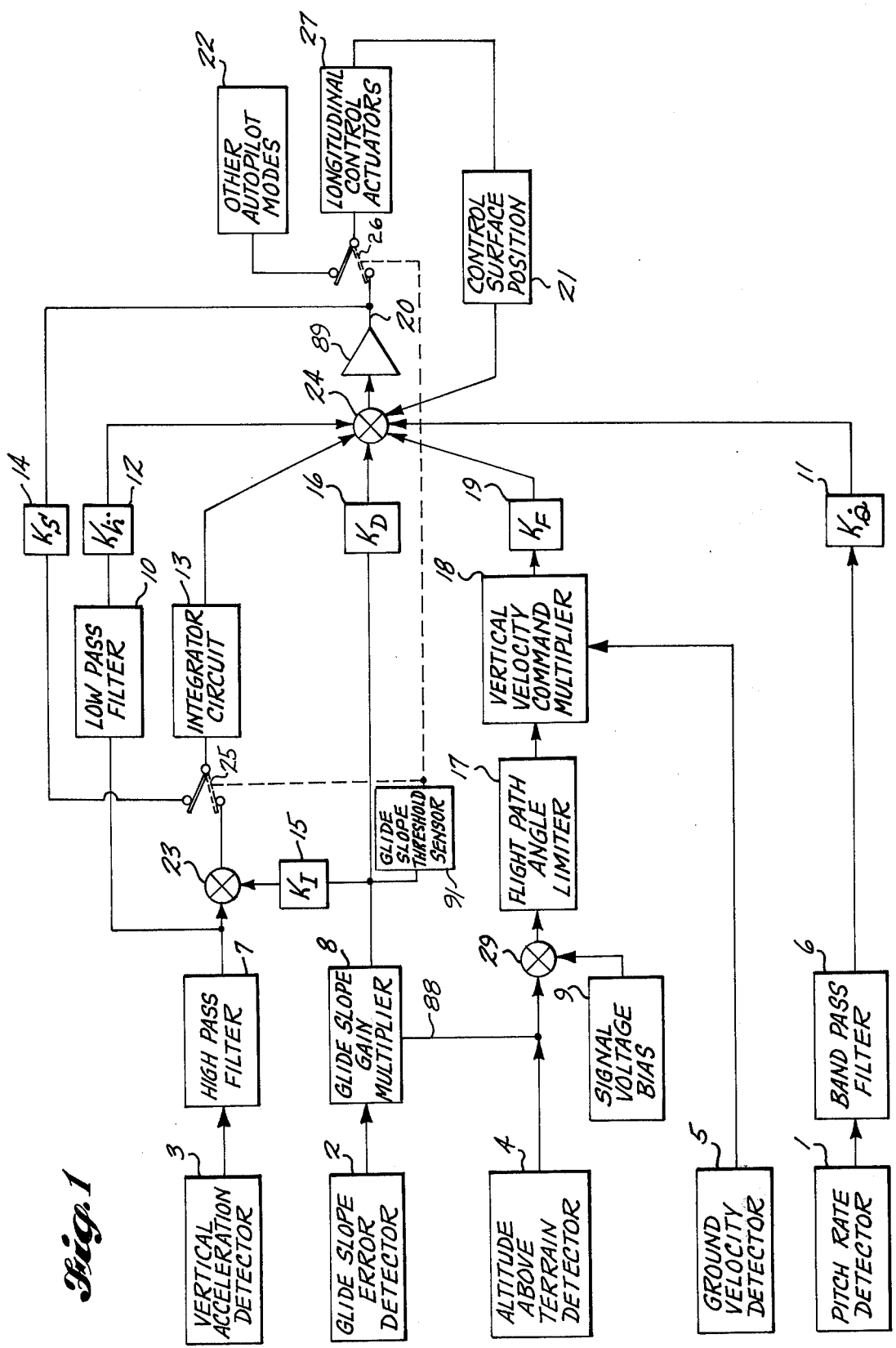
FIG. 1 is a block diagram of a pitch axis control system in accordance with a preferred embodiment of the invention.

Turning now to FIG. 1, there is shown a system embodiment of the present control system having several features which provide the several functions including, e.g., glide slope control, flare out, etc. In the system of FIG. 1, a negative feedback loop is coupled between the system output terminal 20 and system summing junction 24. This negative feedback loop is provided by the circuit path comprising the series connection of integrator circuit means 13, switching means 25 (comprising a switch shown closed in the solid line position) and summing resistor means 14 (represented as having the gain $K_s$). The aforementioned series circuit provides a synchronizing path through summing resistor means 14. This synchronizing path when operating in the synchronizing mode (with switching means 25 closed in the solid line position as shown) provides a means for reducing signals at system output terminal 20 to reference potential (zero) since the output signal voltage of integrator circuit means 13 connected as shown in series circuit becomes substantially equal in magnitude and opposite in polarity to the sum of the other signal voltages coupled to system summing junction 24. In this manner, means are provided for maintaining the pitch axis control signals at control system output terminal 20 substantially at reference potential for eliminating undesired aircraft maneuvers upon initiation of automatic approach and landing computing functions in the present pitch axis control system.

Figure 2:
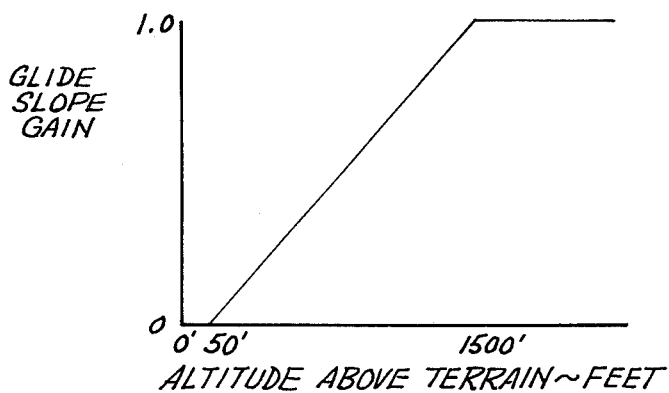
Figure 3:
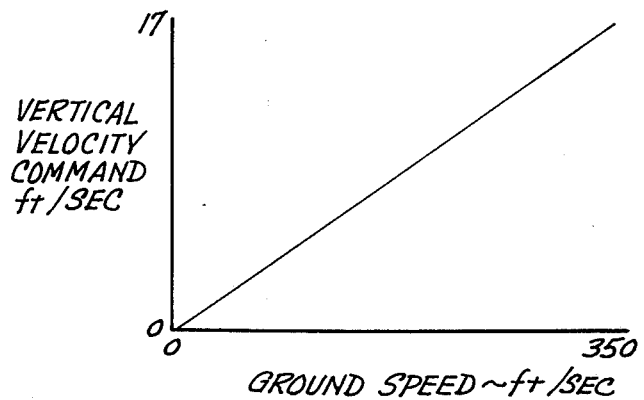
FIG. 3 is a graph illustrative of the amplitude of signals representative of vertical velocity command as a function of signals representative of ground velocity and flight path angle limiter output.

The aforementioned synchronizing path comprises a means for providing signal inputs representative of glide slope acquisition initial conditions in the present automatic approach and landing pitch axis control system thereby enabling maneuver of the aircraft onto the radio defined glide slope zero plane upon engagement of switching means 25 and 26 to provide closed circuit path through the dotted line positions. The present system is thereby conditioned for glide slope zero plane acquisition without utilization of further signal generating means however by utilizing the same system control laws to develop signals representative of the initial conditions which are utilized in the system development of pitch axis control signals for glide slope zero plane tracking. Integrator circuit 13 provides a means for storing at the output thereof a signal equal in magnitude and opposite in polarity to the sum of the other signal voltages coupled to the input of system summing junction 24. Thus, for a glide slope acquisition by the aircraft positioned above or below the glide slope zero plane, the stored signal includes a signal which is equal and of opposite polarity to a signal representative of a fly-down or fly-up command respectively coupled as an input signal voltage to system summing junction 24 through the series circuit path comprising glide slope error detector 2, variable gain multiplier circuit 8, summing resistor circuit 16, and system summing junction 24. Variable gain multiplier circuit 8 comprises any of the types known in the art for multiplying two variable amplitude level signals together and having the gain thereof however varying in the manner shown in the graph of FIG. 2. Switching means 25 and 26 provide closed circuit paths through the positions having the dotted line connections shown at a predetermined level of error signal detected by glide slope threshold sensor 91 from the level representative of glide slope zero plane thereby decoupling the pitch axis control signal at system output signal 20 from the input of integrator circuit 13 and coupling the input of integrator circuit 13 to the output of summing junction 23 and further coupling system output terminal 20 to the longitudinal control actuators 27. The above mentioned switching causes decoupling of the synchronizing path from the control system so that the signal level at the output of integrator circuit 13 remains constant thereby preventglide slope zero plane during changes in aircraft ground velocity (due to wind or an actual slowing down of the aircraft prior to landing) by varying the commanded system vertical velocity as a function of ground velocity thereby providing means for change in the vertical velocity reference of the aircraft without causing maneuver off of the glide slope zero plane and, (2) a means for providing pitch axis control signals representative of flare command maneuver by providing an output signal voltage from multiplier circuit 18 representative of a decreasing vertical velocity command as the aircraft approaches the landing runway.

Since the vertical velocity required to maintain an aircraft on the glide slope zero plane is determined by the angle between the glide slope zero plane and the ground and further by the velocity of the aircraft with respect to the ground, and since the above described angle of the glide slope zero plane is limited to the range 2.5° to 3.0° (under normal conditions), a signal representative of required vertical velocity is generated at the output of vertical velocity command multiplier circuit 18 by multiplying in the circuit a signal representative of the aircraft ground velocity generated by ground velocity detector circuit 5 by a voltage, viz., the output voltage from flight path angle command limiter circuit 17 representative of the glide slope zero plane angle. Means are provided comprising summing resistor circuit 19 for coupling the output of multiplier circuit 18 to system summing junction 24 which signal input to system junction 24 is nulled by a signal voltage of equal amplitude but opposite polarity input to system summing junction 24 from the output of integrator circuit 13 prior to glide slope acquisition. If during the approach, the aircraft changes ground velocity due to wind variation, lowering of flaps, etc., the output signal from velocity detector circuit 5 will cause a change in the output voltage of vertical velocity command multiplier circuit 18 thereby developing an error signal at system output terminal 20 causing aircraft acceleration in an upward or downward direction to maintain the glide slope zero plane and integrator circuit 13 will cause integration of the signal voltage representative of the resultant vertical acceleration and provide an input signal voltage to system summing junction 24 for nulling the aforementioned error signal developed at system output terminal 20. In this manner, means are provided in the system for maintaining the aircraft on the glide slope zero plane during changes in aircraft velocity.

Figure 4:
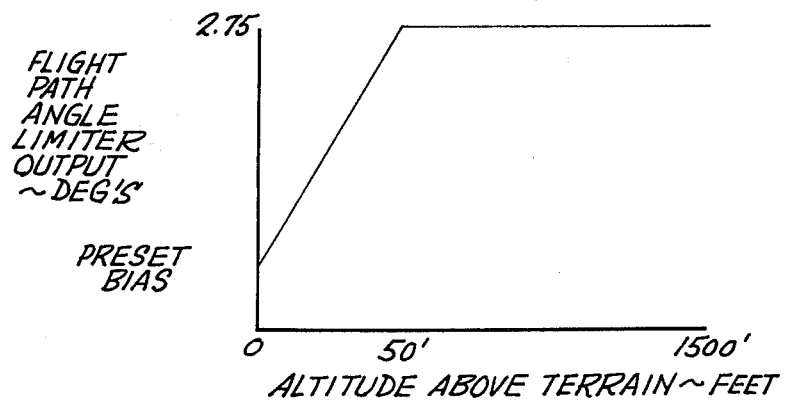
FIG. 4 is a graph representative of glide slope gain programming as a function of altitude above terrain in the system of FIG. 1.

Since the signal voltage provided at the output of flight path angle limiter circuit 17 is representative of desired glide slope zero plane angle or desired aircraft flight path angle, further novel signal processing was provided in the present system for utilizing this signal voltage in a unique manner, viz., for the purpose of providing the flare maneuver of the aircraft onto the runway. The signal voltage available at the output of limiter circuit 17 (shown in FIG. 4) is obtained by limiting the output signal voltage from altitude above terrain detector 4 to an amplitude representative of desired flare initiation altitude, so that when the output signal voltage from altitude above terrain detector circuit 4 is representative of an altitude above the altitude at which amplitude limiting is provided by limiter circuit 17, a pitch axis control signal at the output of limiter circuit 17 representative of a constant flight path angle command is provided. As the aircraft descends to an altitude represented by a signal voltage from altitude above terrain detector circuit 4 equal to the predetermined altitude represented by the limiting voltage output of limiter circuit 17, glide slope gain multiplier circuit 8 is programmed to zero gain by coupling of a gain control signal voltage 88 to multiplier circuit 8 from the series circuit path including altitude above terrain detector circuit 4 which programming to zero gain of multiplier circuit 8 provides a means for decoupling glide slope error detector circuit 2 from the system and the output signal voltage amplitude of flight path angle limiter circuit 17 begins to decrease in proportion to the signal voltage output of altitude above terrain detector circuit 4 since now decreasing below the limiting circuit 17 threshold. Now, since the output signal voltage from flight path angle limiter circuit 17 is proportional to desired flight path angle and therefore also desired aircraft vertical velocity, a decreasing output signal voltage from flight path angle limiter circuit 17 provides a decreasing aircraft flight path angle command and a resultant signal representative of decreasing vertical velocity command is generated at the output of vertical velocity command multiplier circuit 18. A bias signal voltage provided by source 9 is coupled to summing junction 29 also with the altitude above terrain detector 4 circuit output signal voltage as a means for providing a positive touchdown command by the pitch axis control signals at system output terminal 20 when the altitude above the runway (signal voltage from detector circuit 4) is reduced to zero. In this unique manner, the flare-out maneuver of the aircraft is accomplished without additional switching means in the system but by utilizing signal sources already known to be operative since already being utilized in system signal processing earlier in time.

The attendant advantages of the present system which provides a means for varying the vertical velocity command during speed changes without the requirement of generation of a glide slope zero plane error, further provides means for generating feedback signal components which are functions of vertical velocity without utilization of barometric vertical velocity sensing means for providing an input signal in the system and in addition includes features which provide flare-out and landing maneuvers without utilization of a new control law for such additional maneuvers.

What is claimed is:
1. In combination in a pitch axis control system, means for achieving short term stability of an aircraft comprising:
    first means for generating a first signal representative of the change in vertical velocity of said aircraft;
    second means for generating a second signal representative of vertical acceleration of said aircraft;
    third means for generating a third signal representative of pitch rate of said aircraft;
    fourth means for combining said first, second, and third signals; and
    fifth means including longitudinal control actuator means coupled between said fourth means and the control surfaces of said aircraft.

2. The invention according to claim 1 wherein said first means comprises:
    an accelerometer disposed in said aircraft for detecting accelerations of said aircraft in a vertical plane with respect to the ground;
    high pass filter circuit means coupled to the output of said accelerometer; and integrator circuit means coupled to the output of said high pass filter circuit means to integrate the signals representative of said accelerations of said aircraft to provide said first signal.

3. The invention according to claim 1 wherein said second means comprises:
an accelerometer disposed in said aircraft for detecting accelerations of said aircraft in a vertical plane with respect to the ground; and
band pass filter circuit means coupled to the output of said accelerometer to provide said second signal.

4. The invention according to claim 1 wherein said third means comprises:
a pitch rate gyro disposed in said aircraft for detecting pitch rates of said aircraft; and
band pass filter circuit means coupled to the output of said pitch rate gyro for providing said third signal.

5. In combination in a pitch axis control system for an aircraft;
first means for generating a first signal representative of the angular deviation from the glide slope centerline;
second means including first multiplier circuit means connected in series circuit to said first means having a gain varying as a function of altitude above terrain for generating a second signal representative of distance from glide slope centerline;
third means for producing a third signal including high pass filter means representative of vertical acceleration of said aircraft;
fourth means for combining said second signal and said third signal at the input of an integrator circuit for producing a fourth signal at the output of said integrator circuit representative of vertical velocity of said aircraft.
fifth means for generating a fifth signal representative of commanded vertical velocity of said aircraft.
sixth means for combining said second signal, said fourth signal, and said fifth signal to null or cancel said second signal; and
seventh means including longitudinal control actuator means coupled between said sixth means and the control surfaces of said aircraft.

6. The invention according to claim 5 further including pitch rate detector means for producing a signal representative of the pitch rate of said aircraft, and
band bass filter circuit means coupled between said pitch rate detector means and said sixth means.

7. An aircraft pitch axis control system for providing pitch axis control signals at the system output terminal thereof comprising in combination:
first circuit means for providing a first signal representative of vertical acceleration of said aircraft;
high pass filter circuit means responsive to said first signal for providing a second signal;
second circuit means for combining a plurality of input signals at the input terminals thereof and providing an output signal at an output terminal thereof;
third circuit means for providing a third signal representative of glide slope error of said aircraft;
first gain controlled amplifier circuit means responsive to said third circuit means for providing a fourth signal, and means for coupling said second and fourth signals respectively to said input terminals of said second circuit means;

third circuit means for combining a plurality of input signals at the input terminals thereof and providing an output signal at an output terminal thereof, and means for coupling said output terminal to said system output terminal;
fourth circuit means for coupling said third signal to a first of said plurality of input terminals of said third circuit means;
a first series circuit path including low pass filter circuit means responsive to said second signal and coupled to a second of said plurality of input terminals of said third circuit means;
fifth circuit means for providing a fifth signal representative of altitude above terrain of said aircraft;
a limiter circuit;
second gain controlled amplifier circuit means;
sixth circuit means for combining a plurality of input signals including said fifth signal and a bias voltage at respective input terminals thereof and providing an output signal at an output terminal thereof, and means for coupling said output terminal, said limiter circuit and said second gain controlled amplifier circuit means in series circuit path with a third of said plurality of input terminals of said third circuit means;
seventh circuit means for providing a sixth signal representative of ground velocity of said aircraft, said fifth and seventh signals coupled respectively to said first and second gain controlled amplifiers for controlling the respective gains thereof;
eighth circuit means for providing a seventh signal representative of pitch rate of said aircraft;
means including band pass filter circuit means coupled between said eighth circuit means and a fourth of said plurality of input terminals of said third circuit means;
integrator circuit means having an input terminal and an output terminal, said output terminal coupled to a fifth of said plurality of input terminals of said third circuit means;
first switching means for coupling said input terminal of said integrator circuit to said output terminal of said second circuit means for completing a series circuit path including amplifier circuit means to said system output terminal.
second switching means for coupling a series circuit path including longitudinal control actuator means and control surface position sensing means between a sixth of said plurality of input terminals of said third circuit means and said system output terminal or utilization means.

8. In combination in a pitch axis control system for achieving short term stability of an aircraft comprising:
first means for generating a first signal representative of the change in vertical velocity of said aircraft;
second means including an accelerometer disposed in said aircraft for detecting accelerations of said aircraft normal to the flight path of said aircraft and band pass filter circuit means coupled to the output of said accelerometer to provide a second signal representative of vertical acceleration of said aircraft;
third means for generating a third signal representative of pitch rate of said aircraft;
fourth means for combining said first, second, and third signals; and fifth means including longitudinal control actuator means coupled between said fourth means and the control surfaces of said aircraft.

9. In combination in a pitch axis control system for causing an aircraft to track the centerline of a radio defined glide slope:
first means for producing a first signal representative of the deviation of said aircraft from said glide slope;
second means for generating a second signal representative of vertical acceleration of said aircraft including vertical accelerometer and high pass filter circuit coupled in series circuit;
third means for combining said first signal and said second signal at the input of an integrator circuit to produce a third signal at the output of said integrator circuit representative of the change in vertical velocity of said aircraft.
fourth means for producing a fourth signal representative of pitch rate of said aircraft;
fifth means for combining said first, second, third, and fourth signal to null or cancel said first signal;
sixth means including longitudinal control actuator means coupled between said fifth means and the control surfaces of said aircraft to cause said aircraft to track the centerline of a radio defined glide slope.

10. In combination in a pitch axis control system for an aircraft;
first means for generating a first signal representative of the angular deviation from the glide slope centerline;
second means including first multiplier circuit means connected in series circuit to said first means having a gain varying as a function of altitude above terrain for generating a second signal representative of distance from glide slope centerline;
third means for producing a third signal including high pass filter means representative of vertical acceleration of said aircraft;
fourth means for combining said second signal and said third signal at the input of an integrator circuit for producing a fourth signal at the output of said integrator circuit representative of vertical velocity of said aircraft;
fifth means for generating a fifth signal representative of commanded vertical velocity of said aircraft;
sixth means for combining said second signal, said fourth signal, and said fifth signal to null or cancel said second signal;
seventh means including longitudinal control actuator means coupled between said sixth means and the control surfaces of said aircraft;
eighth means for providing an eighth signal representative of ground velocity of said aircraft;
ninth means for generating a ninth signal representative of altitude above terrain of said aircraft;
first limiter circuit means connected in series circuit to said ninth means to produce a tenth signal representative of altitude above terrain of said aircraft;
first limiter circuit means connected in series circuit to said ninth means to produce a tenth signal representative of commanded flight path angle of said aircraft; and
second multiplier circuit means connected to said eighth signal and said tenth signal to produce said fifth signal representative of commanded vertical velocity.

* * * * *